(12) United States Patent
Russel-Smith

(10) Patent No.: US 6,572,262 B1
(45) Date of Patent: Jun. 3, 2003

(54) DENSIFYING OF A BULK PARTICULATE MATERIAL

(75) Inventor: Kevan Vaughan Russel-Smith, Die Heuwel (ZA)

(73) Assignee: Elkem Asa (NO)

(*) Notice: Subject to any disclaimer, the term of this patent is extended or adjusted under 35 U.S.C. 154(b) by 0 days.

(21) Appl. No.: 09/720,385

(22) PCT Filed: Jun. 25, 1999

(86) PCT No.: PCT/IB99/01199

§ 371 (c)(1),
(2), (4) Date: Apr. 2, 2001

(87) PCT Pub. No.: WO00/00418

PCT Pub. Date: Jan. 6, 2000

(30) Foreign Application Priority Data

Jun. 26, 1998 (SC) ................................................ 98/5615

(51) Int. Cl.⁷ .............................. B01F 3/00; B01F 7/00
(52) U.S. Cl. ..................... 366/348; 366/108; 366/132; 366/279; 366/315
(58) Field of Search ................................ 366/279, 315, 366/317, 108, 109, 131, 132, 133, 153.1, 184, 219, 348; 222/226

(56) References Cited

U.S. PATENT DOCUMENTS

| | | | | |
|---|---|---|---|---|
| 1,084,210 A | * | 1/1914 | Howard | |
| 1,814,171 A | | 7/1931 | Marsh | |
| 3,075,710 A | * | 1/1963 | Feld et al. | |
| 3,290,016 A | * | 12/1966 | Lennon et al. | |
| 3,856,213 A | * | 12/1974 | Dulaney et al. | |
| 5,327,947 A | * | 7/1994 | McGregor | |

FOREIGN PATENT DOCUMENTS

CH                513033              11/1971

* cited by examiner

*Primary Examiner*—Joseph Drodge
(74) *Attorney, Agent, or Firm*—Muserlian, Lucas & Mercanti

(57) ABSTRACT

A method of densifying a bulk particulate material includes at least partially confining the bulk particulate material, and rotating a rotatable member submerged under the bulk particulate material about an axis of rotation to cause movement of the material particles essentially towards or away from the axis or rotation, thereby to provide a densified bulk particulate material. The method is particularly suitable for densifying silica fume. The invention extends to apparatus for densifying a bulk particulate material.

31 Claims, 4 Drawing Sheets

DENSIFYING OF A BULK PARTICULATE MATERIAL

THIS INVENTION relates to densifying of a bulk particulate material. In particular, it relates to a method and to apparatus for densifying a bulk particulate material.

According to a first aspect of the invention, there is provided a method of densifying a bulk particulate material, the method including at least partially confining the bulk particulate material; and rotating a rotatable member submerged under the bulk particulate material about an axis of rotation to cause movement of the material particles essentially towards or away from the axis of rotation, thereby to provide a densified bulk particulate material.

Thus, at least on initial contact of the material particles with the rotatable member, the particles move generally towards or away from the axis of rotation.

Confining the bulk particulate material may include feeding the bulk particulate material into a vessel. Typically, the vessel has a wall defining a circular cylindrical interior surface. The vessel may have a central, longitudinal axis which is coaxial with the axis of rotation of the rotatable member.

The method may include vibrating the vessel to inhibit agglomeration or build-up or caking of the particulate material against interior surfaces of the vessel.

The method may include discharging the densified bulk particulate material from the vessel. It is to be appreciated that the method can be conducted on a continuous basis or on a batch basis, discharging of the densified bulk particulate material from the vessel and feeding of bulk particulate material into the vessel thus occurring batch-wise, or on a controlled basis. Thus, the bulk particulate material may be fed on a continuous basis into the vessel, and the densified bulk particulate material may be discharged on a continuous basis from the vessel.

The method may include measuring or determining the bulk density of the densified bulk particulate material prior to discharging it from the vessel. Instead, the method may include measuring or determining the bulk density of the densified bulk particulate material after it has been discharged from the vessel.

The method may include controlling the density of the densified bulk particulate material. The controlling of the density of the densified bulk particulate material may be effected by a method selected from the group consisting of manipulating the residence time of the bulk particulate material in the vessel, manipulating the angular speed of rotation of the rotatable member, manipulating the level of the bulk particulate material in the vessel, or two or more of these methods The controlling of the density of the densified bulk particulate material is however not necessarily limited to these methods.

The axis of rotation of the rotatable member may be substantially vertical. Preferably, the rotatable member causes movement of the material particles inwardly towards the vertical axis of rotation. In another embodiment of the invention, the coaxial axis of rotation and longitudinal axis of the vessel are at an angle of about 60° to the horizontal.

The rotatable member may be rotated at an angular speed-of between 100 rpm and 3500 rpm. Preferably, the rotatable member is rotated at an angular speed of between 500 rpm and 1000 rpm. Typically, the rotatable member is rotated at an angular speed of between 700 rpm and 800 rpm, e.g. about 732 rpm.

The bulk particulate material may have a mean particle size of less than 1 mm. Typically, the bulk particulate material has a mean particle size of less than 0.5 mm, even less than 1 $\mu$m, e.g. about 0.15 $\mu$m.

The method may include extracting dust from the vessel.

The bulk particulate material may be particulate silica having a particle size of the less than 0.5 $\mu$m, typically less than 0.2 $\mu$m. Indeed, it is expected that the invention will find particular, though not necessarily exclusive application in densifying so-called silica fume.

The ratio of the density of the silica prior to densifying thereof, to the density of the densified silica may be at least than 2:3. Preferably, the ratio of the density of the silica prior to densifying thereof, to the density of the densified silica is at least 1:2, depending on the density of the silica prior to densifying. The ratio can be as large as 1:3, or even larger, depending on the density of the silica prior to densifying.

According to a second aspect of the invention, there is provided apparatus for densifying a bulk particulate material, the apparatus including a vessel for at least partially confining a body of the bulk particulate material;

a rotatable member which is arranged such that in use it is submerged in the body of bulk particulate material and causes movement of the material particles essentially towards or away from an axis of rotation when the rotatable member is rotated about the axis of rotation; and drive means connected to the rotatable member and capable of rotating the rotatable member when it is submerged in the body of bulk particulate material.

The vessel may have an outlet for densified bulk particulate material at a low elevation, and an inlet for bulk particulate material at a higher elevation than the outlet. The rotatable member may be located between the inlet and the outlet of the vessel. Preferably, the rotatable member is located at the elevation of the outlet of the vessel.

The drive means may be capable of rotating the rotatable member at an angular speed of between 100 rpm and 3500 rpm when the rotatable member is submerged in the body of particulate material. Typically, the drive means is capable of rotating the rotatable member at an angular speed of between 500 rpm and 1000 rpm when the rotatable member is submerged in the body of particulate material, e.g. at about 700 rpm to 800 rpm.

The rotatable member may include a plurality of circumferentially spaced vanes. The vanes may be directed or arranged in use to displace the bulk particulate material generally radially relative to the axis of rotation of the rotatable member. Preferably, the vanes are directed or arranged so that the movement of the material particles is inwardly towards the axis of rotation when the rotatable member is rotated, at least on initial contact of the material particles with the rotatable member.

The rotatable member may include a disk-shaped body from which the vanes project. The vanes may project from a surface of the disk-shaped body which is an upper surface in use. Instead, the vanes may project radially outwardly from a periphery of the disk-shaped body.

The vanes may be planar and may be substantially tangential to a drive shaft connecting the drive means to the rotatable member. A radially inner end portion of each vane may be truncated so that the radially inner end of the vane forms an angle of between 15° and 60° with the axis of rotation in the plane of the vane. Preferably, the angle is between 20° and 50°, e.g. about 30°.

The vessel may have a wall defining a circular cylindrical interior surface, and a central, longitudinal axis which may be coaxial with the axis of rotation of the rotatable member. The ratio of the diameter of a circle described by the rotatable member when it rotates, to the diameter of the vessel may be between 0.25:1 and 0.99:1. Preferably, the ratio is between 0.5:1 and 0.99:1. Typically, the ratio of the diameter of the circle described by the rotatable member when it rotates, to the diameter of the vessel is between 0.9:1 and 0.99:1, e.g. about 0.95:1.

The vessel may have a volume of between 0.1 m$^3$ and 200 m$^3$. Typically, the vessel has a volume of between 0.1 m$^3$ and 0.5 m$^3$.

The axis of rotation of the rotatable member may be substantially vertical.

The apparatus may include conveying means and bagging means, the conveying means being arranged to convey densified bulk particulate material from the vessel to the bagging means for bagging the densified bulk particulate material.

The apparatus may include vibration means for vibrating the vessel to inhibit agglomeration or caking or build-up of the particulate material against interior surfaces of the vessel.

The apparatus may include dust extraction means for extracting dust from the vessel.

The rotatable member and interior surfaces of the vessel may be coated with a material which inhibits caking or agglomeration or build-up of the bulk particulate material against or on them.

The apparatus may include density measurement means and control means for controlling the bulk density of the densified bulk particulate material.

The invention will now be described, by way of example, with reference to the accompanying diagrammatic drawings and examples.

In the drawings

Figure 1:
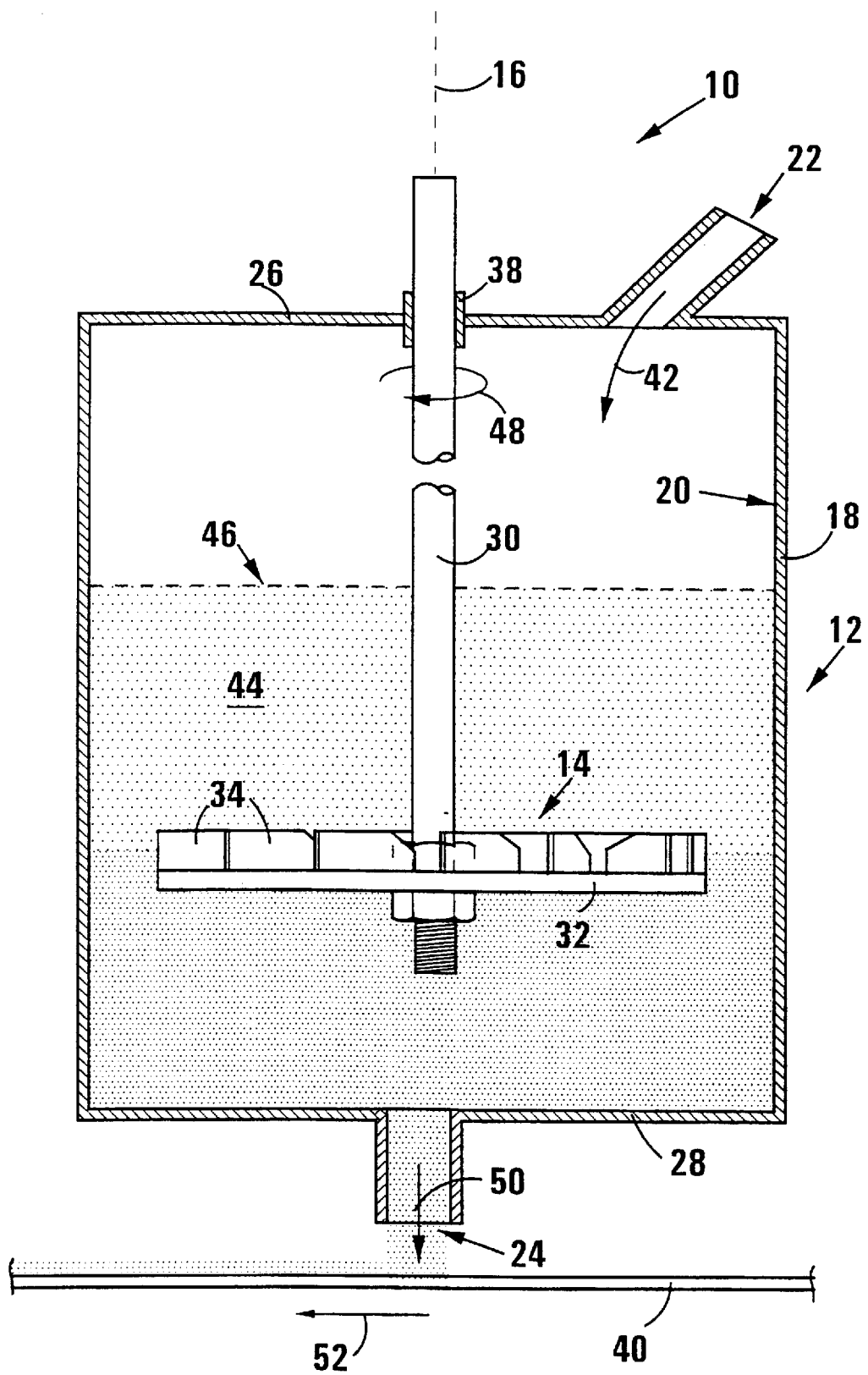
FIG. 1 shows a sectioned elevational view of one embodiment of apparatus in accordance with the invention for densifying a bulk particulate material.

Referring to FIG. 1 of the drawings, reference numeral 10 generally indicates one embodiment of an apparatus in accordance with the invention for densifying a bulk particulate material. The apparatus 10 includes a vessel 12 for containing and confining the bulk particulate material, and a rotatable member 14 which is in use submerged in the bulk particulate material contained in the vessel 12, and which is rotatable about a vertical axis of rotation 16.

The vessel 12 includes a circular cylindrical wall 18 which defines a circular cylindrical interior surface 20 of the vessel 12. Thus, the vessel 12 has a central, longitudinal vertical axis which corresponds or which is coaxial with the axis of rotation 16. In another embodiment of the invention, the axis of the vessel and the axis of rotation may be angularly disposed relative to the horizon, e.g. at an angle of about 60°.

The vessel 12 includes an inlet 22 for the bulk particulate material, and an outlet 24 for densified bulk particulate material. The inlet 22 is located in a roof 26 of the vessel 12, and the outlet 24 is located in a floor 28 of the vessel 12.

The rotatable member 14 is located between the inlet 22 and the outlet 24. The rotatable member 14 is mechanically attached to a drive shaft 30, which is in turn drivenly connected to an electric motor (not shown). The electric motor is capable of selectively rotating the rotatable member 14 at an angular speed of between 2600 and 3000 rpm.

The rotatable member 14 includes a disklike body 32 from which a plurality of circumferentially spaced planar vanes 34 projects. The vanes 34 are directed or arranged in use to displace the bulk particulate material contained in the vessel 12 inwardly towards the axis of rotation 16. The vanes 34 project from a surface 36 of the disklike body 32 which is an upper surface in use.

The disklike body 32, and thus the rotatable member 14, has a diameter of 720 mm. The vessel 12 has an internal diameter of about 800 mm. Thus, a ratio of the diameter of the rotatable member 14: the diameter of the vessel 12 is 0.9:1.

The drive shaft 30 extends through the roof 26 of the vessel 12. A seal 38 is provided between the drive shaft 30 and the roof 26.

A conveyor belt 40 is provided underneath the outlet 24.

A dust extraction outlet (not shown) is provided for the vessel 12, and a vibrator (not shown) is mounted against the exterior surface of the wall 18.

In use, the vessel 12 is fed on a controlled basis with bulk particulate material 44, as shown by arrow 42, to maintain a level 46 of the bulk particulate material in the vessel 12 sufficient to cover the rotatable member 14.

The submerged rotatable member 14 is rotated at an angular speed of about 2900 rpm, in the direction of arrow 48, by means of the electric motor and the drive shaft 30. The vanes 34 displace the particles of the bulk particulate material inwardly towards to the axis of rotation 16 and densities the bulk particulate material. The vibrator is run to inhibit caking of the bulk particulate material against interior surfaces of the vessel 12, and dust which is formed is extracted through the dust extraction outlet.

The densified bulk particulate material is discharged through the outlet 24 as shown by arrow 50 on to the conveyor belt 40, which moves in the direction of arrow 52. The density of the densified bulk particulate material on the conveyor belt 40 is measured by density measurement and control means (not shown), which increases or decreases the discharge rate of the densified bulk particulate material from the vessel 12, thereby increasing or decreasing the residence time of the bulk particulate material in the vessel 12, in order to densify the bulk particulate material to a desired bulk density.

Figure 3:
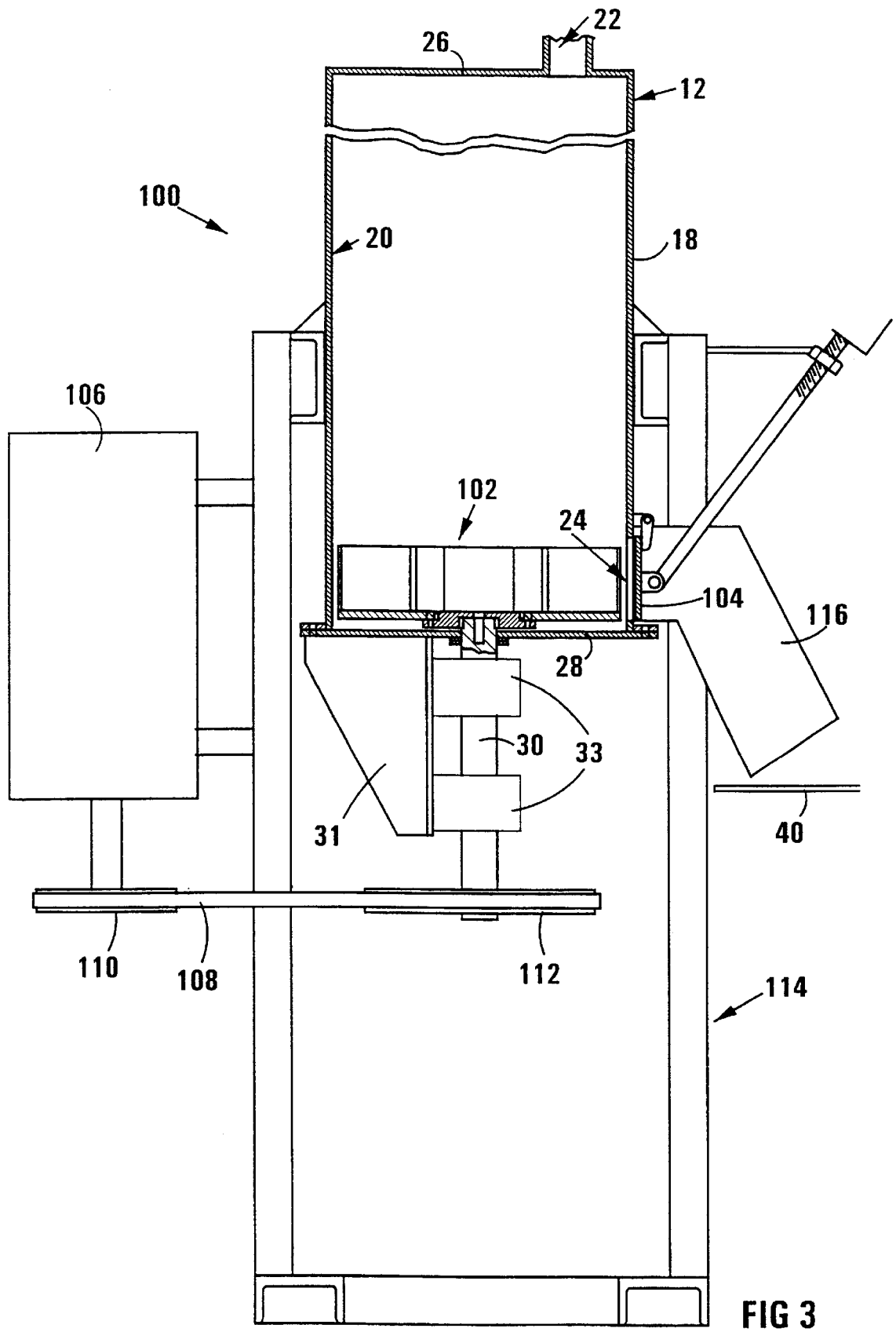
FIG. 3 shows a sectioned elevational view of another embodiment of apparatus in accordance with the invention for densifying a bulk particulate material.

Referring to FIG. 3 of the drawings, another embodiment of apparatus in accordance with the invention for densifying a bulk particulate material is generally indicated by reference numeral 100. The apparatus 100 is similar to the apparatus 10, and unless otherwise indicated, the same reference numerals used in relation to the apparatus 10, are used to indicate the same or similar parts or features of the apparatus 100.

Figure 4:
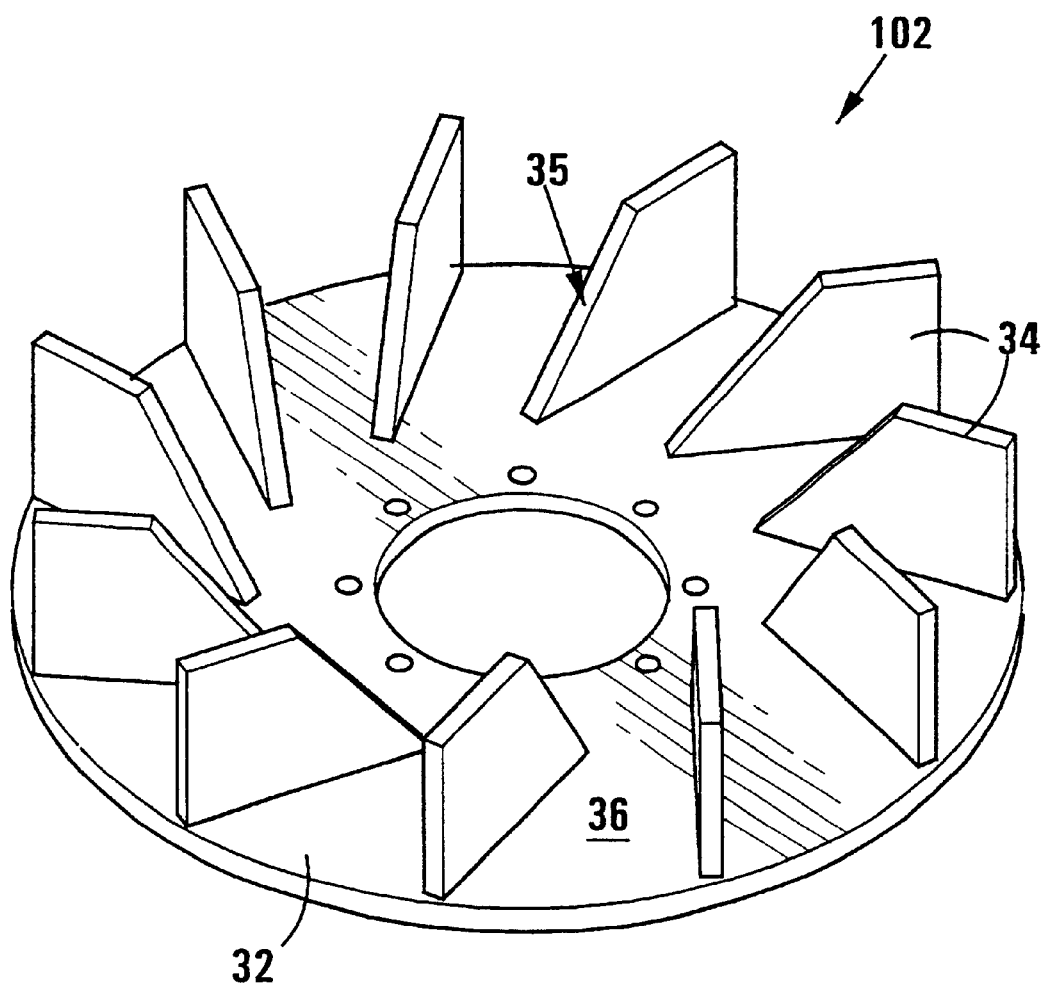
FIG. 4 shows a three-dimensional view of a rotatable member of the apparatus of FIG. 3.

The apparatus 100 includes a rotatable member 102, which is more clearly illustrated in FIG. 4 of the drawings. As can be seen in FIG. 4, the vanes 34 are vertical and planar, and are substantially tangential to the drive shaft 30 (not shown) in FIG. 4, which is operatively connected to the rotatable member 102. An inner end portion of each vane 34 is truncated so that the radially inner end 35 of each vane 34 forms an angle of about 30° with the axis of rotation of the rotatable member 34, in the plane of the vane 34.

The rotatable member 102 is located at the elevation of the outlet 24 of the vessel 12. The outlet 24 is provided in a lower portion of the wall 18 of the vessel 12. A manually operated outlet cover 104 is provided to control the rate of release of densified bulk particulate material from the vessel 12 in use.

The drive shaft 30 is rotatably mounted to a support member 31 by means of two plummer blocks 33 and is operatively connected to an electric motor 106, by means of a drive belt 108 and two pulleys 110, 112. The arrangement of the motor 106 and the pulleys 110, 112 is such that, in use, the motor 106 is capable of rotating the rotatable member 102 at an average speed of between 700 rpm and 800 rpm.

The vessel 12 and motor 106 are mounted on a support structure 114.

The vessel 12 has an internal diameter of about 576 mm, and a height of about 1500 mm. The rotatable member 102 has a diameter of about 550 mm. Thus, the ratio of the diameter of the rotatable member 102 to the diameter of the vessel 12 is about 0.95:1.

The apparatus 100 is used in similar fashion to the apparatus 10 to densify bulk particulate material. Thus, bulk particulate material is fed into the vessel 12 through the inlet 22 to maintain a level of the bulk particulate material in the vessel 12 sufficient to cover the rotatable member 102, and the rotatable member 102 is rotated at an angular speed of about 732 rpm by means of the electric motor 106 and drive shaft 30. The vanes 34 displace the material particles inwardly towards the axis of rotation of the rotatable member 102 and densifies the bulk particulate material. The densified bulk particulate material is discharged periodically through the outlet 24 onto the conveyor belt 40 by means of a shoot 116. The conveyor 40 conveys the densified bulk particulate material to a bagging plant (not shown), which bags the densified bulk particulate material.

EXAMPLE 1

1000 g of an undensified or raw silica fume at room temperature was placed in a laboratory scale cylindrical container having an internal diameter of about 155 mm and a height of about 300 mm. The undensified silica fume had the following composition:

|  | % (w/w dry basis) |
| --- | --- |
| $Fe_2O_3$ | 0,15 |
| CaO | 0,20 |
| $Al_2O_3$ | 0,15 |
| MgO | 0,40 |
| $Na_2O$ | 0,15 |
| $K_2O$ | 0,50 |
| MnO | 0,02 |
| $TiO_2$ | 0,06 |
| $P_2O_5$ | 0,10 |
| C | 5,0 |
| S | 0,25 |
| Ni | 0,03 |
| Zn | 0,03 |
| Pb | 0,003 |
| Cu | 0,002 |
| Co | 0,002 |
| $SiO_2$ | 92,953% |

The pH (5 g/100 ml distilled water) of the undensified silica fume was between 6.5 and 7.8, it had a moisture content of about 0.4% and a mean particle diameter of about 0.15 µm. The bulk density of the undensified silica fume was about 281.7 kg/m³.

Figure 2:
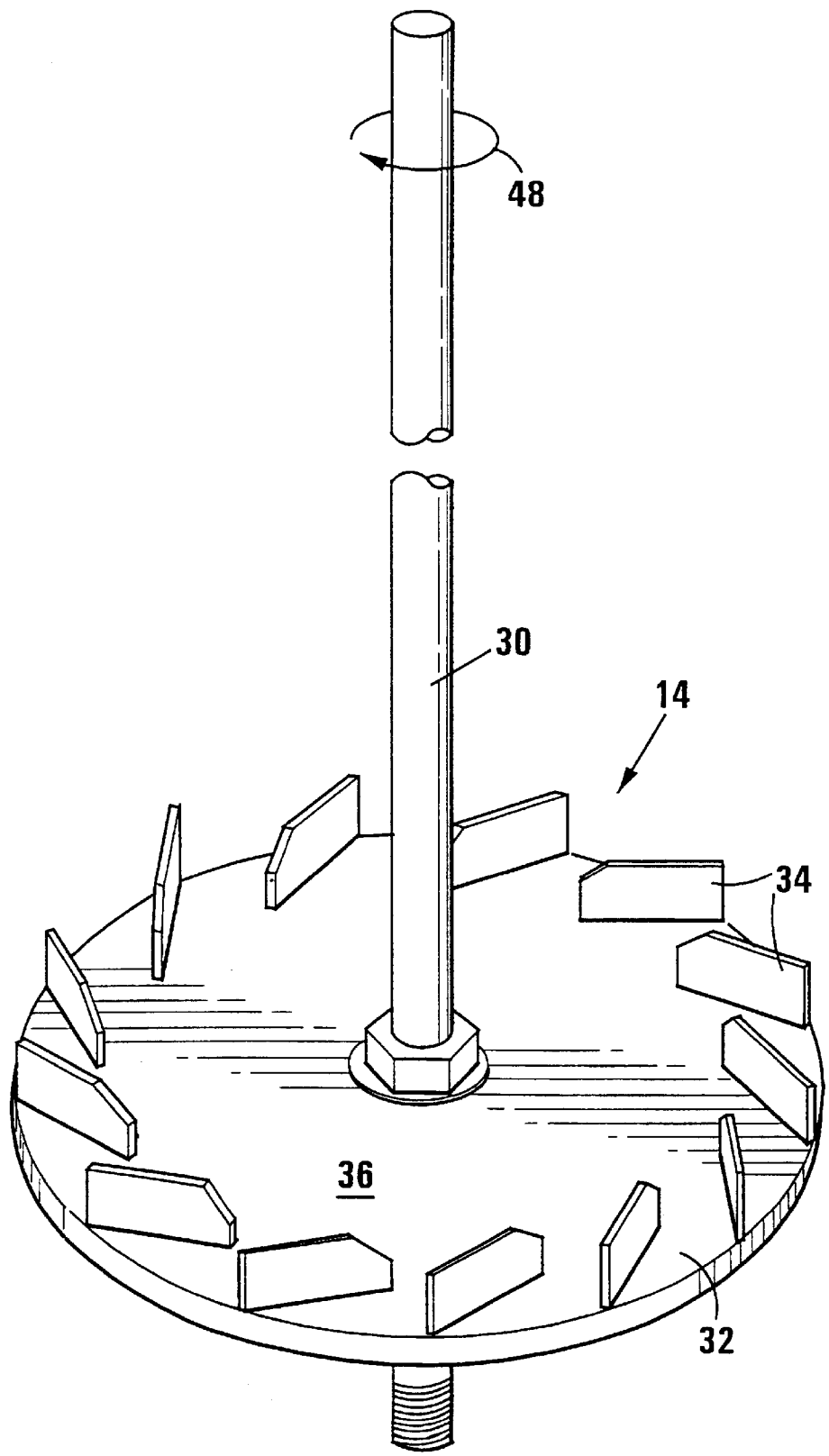
FIG. 2 shows a three-dimensional view of a rotatable member of the apparatus of FIG. 1.

A rotatable member as shown in FIG. 2 of the drawings, and having a diameter of about 135 mm, was submerged in the silica fume in the container, and was rotated at an angular speed of about 300 rpm for a period of about 150 seconds to densify the silica fume. The densified silica fume was removed from the container, and its density was determined. It was found that the densified silica fume had a density of about 623.7 kg/m³ and a temperature of 69° C.

EXAMPLE 2

The apparatus 100 was used to densify silica fume of unknown composition. Sixteen runs were conducted, and the results are summarised in the following table. For each run, the rotatable member 102 was rotated at an angular speed of 732 rpm and was ramped up to speed within about 3 seconds, and again stopped, after completion of the run, in about 3 seconds.

| Density of raw silica fume (kg/m³) | 244.5 | 244.5 | 248.1 | 225.2 | 232.4 | 222 | 232.4 | 231.4 |
| --- | --- | --- | --- | --- | --- | --- | --- | --- |
| Initial temperature of silica fume (° C.) | 40 | 51 | 53 | 50 | 52 | 34 | 34 | 36 |
| Weight of silica fume (kg) | 33.3 | 55.5 | 38.7 | 40.5 | 41.1 | 40.2 | 41.8 | 39.9 |
| Density of densified silica fume (kg/m³) | 659.3 | 713.9 | 590.2 | 643.7 | 632.2 | 620.8 | 599 | 652.1 |
| Temperature of densified silica fume (° C.) | 110 | 140 | 90 | 110 | 110 | 72 | 80 | 80 |
| Densification time (minutes) | 5 | 5 | 2 | 3 | 3 | 3 | 3 | 3 |
| Ratio of density of raw silica fume to density of densified silica fume | 1:2.7 | 1:2.9 | 1:2.4 | 1:2.9 | 1:2.7 | 1:2.8 | 1:2.6 | 1:2.8 |
| Density of raw silica fume (kg/m³) | 239.3 | 242 | 237.3 | 246.9 | 232.2 | 232.2 | 234.1 | 240 |
| Initial temperature of silica fume (° C.) | 36 | 38 | 43 | 51 | 34 | 36 | 36 | 38 |
| Weight of silica fume (kg) | 41.9 | 41.7 | 39.8 | 42.1 | 43.4 | 43.3 | 40.1 | 41.8 |
| Density of densified silica fume (kg/m³) | 644.2 | 638.5 | 592.3 | 655.2 | 628.8 | 642.9 | 630.1 | 650 |
| Temperature of densified silica fume (° C.) | 83 | 60 | 105 | 105 | 80 | 80 | 83 | 60 |
| Densification time (minutes) | 3 | 3 | 1.5 | 3.5 | 3 | 3 | 3 | 3 |
| Ratio of density of raw silica fume to density of densified silica fume | 1:2.7 | 1:2.6 | 1:2.5 | 1:2.7 | 1:2.7 | 1:2.8 | 1:2.7 | 1:2.7 |

It is an advantage of the invention, as illustrated, that it provides a cost effective method and apparatus for densifying a bulk particulate material, such as silica fume. It is a further advantage of the invention, as illustrated, that the method and apparatus are capable of densifying a silica fume to a higher bulk density than conventional methods and apparatus used for the densifying of silica fume.

What is claimed is:

1. A method of densifying a bulk particulate material, the method including at least partially confining the bulk particulate material;

rotating a rotatable member submerged in the bulk particulate material about an axis of rotation, the rotatable member includes a plurality of circumferentially spaced vanes each defining a material contacting surface facing substantially tangentially in the direction of rotation and each vane slanted to have a radially outer and leading a radially inner end; and with the rotating material contacting surface, moving the material particles tangentially and radially relative to the axis of rotation.

2. A method as claimed in claim 1, in which confining the bulk particulate material includes feeding the bulk particulate material into a vessel.

3. A method as claimed in claim 2, in which the vessel has a wall defining a circular cylindrical interior surface, the vessel having a central, longitudinal axis which is coaxial with the axis of rotation of the rotatable member.

4. A method as claimed in claims 2, which includes vibrating the vessel to inhibit agglomeration or build-up or caking of the particulate material against interior surfaces of the vessel.

5. A method as claimed in claim 2, in which the bulk particulate material is fed on a continuous basis into the vessel, and which includes discharging the densified bulk particulate material on a continuous basis from the vessel.

6. A method as claimed in claim 2, which includes controlling the density of the densified bulk particulate material, the controlling of the density of the densified bulk particulate material being effected by a method selected from the group consisting of manipulating the residence time of the bulk particulate material in the vessel, manipulating the angular speed of rotation of the rotatable member, manipulating the level of the bulk particulate material in the vessel, or two or more of these methods.

7. A method as claimed in claim 1, in which the axis of rotation of the rotatable member is substantially vertical.

8. A method as claimed in claim 1, in which the rotatable member is rotated at an angular speed of between 100 rpm and 3500 rpm.

9. A method as claimed in claim 8, in which the rotatable member is rotated at an angular speed of between 500 rpm and 1000 rpm.

10. A method as claimed in claim 9, in which the rotatable member is rotated at an angular speed of between 700 rpm and 800 rpm.

11. A method as claimed in claim 1, in which the rotatable member is rotated such that a point on the circumference of the rotatable member travels at a speed of between about 21 m/s and about 23 m/s.

12. A method as claimed in claim 1, in which the bulk particulate material has a mean particle size of less than 1 mm.

13. A method as claimed in claim 12, in which the bulk particulate material has a mean particle size of less than 0.1 mm.

14. A method as claimed in claim 1, in which the bulk particulate material is particulate silica having a particle size of less than 0.5 $\mu$m.

15. A method as claimed in claim 14, in which the ratio of the density of the silica prior to densifying thereof, to the density of the densified silica is at least 2:3.

16. A method as claimed in claim 15, in which the ratio of the density of the silica prior to densifying thereof, to the density of the densified silica is at least 1:2.

17. Apparatus for densifying a bulk particulate material, the apparatus including a vessel for at least partially confining a body of the bulk particulate material;

a rotatable member located in the vessel and arranged such that in use it is submerged in the body of bulk particulate material, the rotatable member includes a plurality of circumferentially spaced vanes each defining a material contacting surface facing substantially tangentially in the direction of rotation, each vane slanted to have a radially outer end leading a radially inner end, in use causing movement of material particles tangentially and radially relative to an axis of rotation when the rotatable member is rotated; and drive means connected to the rotatable member and capable of rotating the rotatable member about said axis of rotation when the rotatable member is submerged in the body of bulk particulate material.

18. Apparatus as claimed in claim 17, in which the vanes project from an upper surface of a disk-shaped body.

19. Apparatus as claimed in claim 17, in which the vanes define planar material contacting surfaces which are substantially tangential to a drive shaft connecting the drive means to the rotatable member.

20. Apparatus as claimed in claim 19, in which a radially inner end portion of each vane is truncated so that the radially inner end of the vane forms an angle of between 15° and 60° with the axis of rotation in the plane of the material contacting surface of the vane.

21. Apparatus as claimed in claims 17, in which the vessel has an outlet for densified bulk particulate material at a low elevation, and an inlet for bulk particulate material at a higher elevation than the outlet, the rotatable member being located at the elevation of the outlet of the vessel.

22. Apparatus as claimed in claim 17, in which the drive means is capable of rotating the rotatable member at an angular speed of between 100 rpm and 3500 rpm when the rotatable member is submerged in the body of particulate material.

23. Apparatus as claimed in claim 22, in which the drive means is capable of rotating the rotatable member at an angular speed of between 500 rpm and 1000 rpm when the rotatable member is submerged in the body of particulate material.

24. Apparatus as claimed in claim 17, in which the vessel has a wall defining a circular cylindrical interior surface, and in which the vessel has a central longitudinal axis which is coaxial with the axis of rotation of the rotatable member, the ratio of the diameter of a circle described by the rotatable member when it rotates, to the diameter of the vessel being between 0.25:1 and 0.99:1.

25. Apparatus as claimed in claim 24, in which the ratio of the diameter of the circle described by the rotatable member when it rotates, to the diameter of the vessel is between 0.9:1 and 0.99:1.

26. Apparatus as claimed in claim 17, in which the vessel has a volume of between 0.1 $m^3$ and 200 $m^3$.

27. Apparatus as claimed in claim 26, in which the vessel has a volume of between 0.1 $m^3$ and 0.5 $m^3$.

28. Apparatus as claimed in claim 17, in which the axis of rotation of the rotatable member is substantially vertical.

29. Apparatus as claimed in claim 17, which includes conveying means and bagging means, the conveying means being arranged to convey densified bulk particulate material from the vessel to the bagging means for bagging the densified bulk particulate material.

30. Apparatus as claimed in claim 17, which includes vibration means for vibrating the vessel to inhibit agglomeration or caking or build-up of the particulate material against interior surfaces of the vessel.

31. Apparatus as claimed in claim 19, in which the drive means is capable of rotating the rotatable member such that a point on the circumference of the rotatable member travels at a speed of between about 21 m/s and about 23 m/s.

\* \* \* \* \*